United States Patent
Ebert et al.

(10) Patent No.: US 11,517,905 B2
(45) Date of Patent: Dec. 6, 2022

(54) METHOD TO MONITOR AND CONTROL THE TEMPERATURE OF A SAMPLE HOLDER OF A LABORATORY INSTRUMENT

(71) Applicant: Roche Molecular Systems, Inc., Pleasanton, CA (US)

(72) Inventors: Sven Ebert, Rotkreuz (CH); Paul Federer, Rotkreuz (CH); Pius Hermann, Rotkreuz (CH); Stefan Vollenweider, Rotkreuz (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 578 days.

(21) Appl. No.: 16/516,062

(22) Filed: Jul. 18, 2019

(65) Prior Publication Data
US 2020/0030807 A1 Jan. 30, 2020

(30) Foreign Application Priority Data
Jul. 24, 2018 (EP) .................................... 18185154

(51) Int. Cl.
*B01L 7/00* (2006.01)
*G01N 25/00* (2006.01)

(52) U.S. Cl.
CPC ................ *B01L 7/52* (2013.01); *G01N 25/00* (2013.01); *B01L 2200/147* (2013.01); *B01L 2300/0627* (2013.01); *B01L 2300/0829* (2013.01); *B01L 2300/1822* (2013.01); *B01L 2300/1827* (2013.01)

(58) Field of Classification Search
CPC ..... G01N 25/00; B01L 7/52; B01L 2200/147; B01L 2300/0627; B01L 2300/0829; B01L 2300/1822; B01L 2300/1827
See application file for complete search history.

(56) References Cited

U.S. PATENT DOCUMENTS

| 5,255,149 A | 10/1993 | Matsuo |
| 6,535,824 B1* | 3/2003 | Mansky .............. G01N 25/005 422/417 |
| 2008/0021264 A1 | 1/2008 | Neisz |
| 2008/0212643 A1* | 9/2008 | McGahhey .............. B01L 7/52 374/E1.004 |
| 2009/0120104 A1 | 5/2009 | Federer |
| 2010/0116896 A1 | 5/2010 | Goemann-Thoss |
| 2010/0150203 A1 | 6/2010 | Timmann et al. |
| 2015/0367348 A1 | 12/2015 | Sano et al. |

FOREIGN PATENT DOCUMENTS

| CN | 102471746 A | 5/2012 |
| CN | 104120077 A | 10/2014 |
| EP | 2949741 A1 | 12/2015 |
| EP | 2739747 B1 | 8/2016 |
| JP | H04271229 A | 9/1992 |
| JP | 2009118845 A5 | 7/2011 |
| JP | 2014143927 A | 8/2014 |
| JP | 2016185102 A | 10/2016 |
| WO | 2012166913 A1 | 12/2012 |
| WO | 2013184416 A3 | 12/2013 |

OTHER PUBLICATIONS

International Search Report dated Jan. 4, 2019 in connection with EP18185154.4.

\* cited by examiner

*Primary Examiner* — David C Thomas
(74) *Attorney, Agent, or Firm* — Maneesh Gupta

(57) ABSTRACT

A method to monitor and control the temperature of a sample holder of a laboratory instrument during execution of a temperature profile on the sample holder is presented. The laboratory instrument comprises a sample holder with high temperature uniformity and at least three identical temperature sensors. The measured actual temperatures of the sample holder are processed in order to determine if the execution of the temperature profile should be continued or aborted. Furthermore, temperature sensors which measure actual temperatures that do not fulfil certain requirements are excluded from further monitoring and controlling the temperature of a sample holder.

10 Claims, 5 Drawing Sheets

METHOD TO MONITOR AND CONTROL THE TEMPERATURE OF A SAMPLE HOLDER OF A LABORATORY INSTRUMENT

CROSS-REFERENCE TO RELATED APPLICATIONS

This application claims the benefit and priority of European Application Serial No. 18185154.4, filed Jul. 24, 2018, which is incorporated herein by reference.

FIELD OF THE DISCLOSURE

The present disclosure belongs to the field of in vitro diagnostic test sample treatment. Within this field, it relates to a method, a laboratory instrument, a computer program product, and a computer-readable medium for reliable monitoring and controlling of a sample holder temperature within a laboratory instrument during execution of a temperature profile on the sample holder.

BACKGROUND

In diagnostic laboratory environments test samples are processed and analysed on multiple laboratory instruments such as pre-analytical, analytical, and post-analytical instruments. Typically, such laboratory instruments comprise means for performing thermal treatments or temperature-dependent reactions of test samples within sample vessels. During temperature-dependent reactions performed on an analytical instrument, the presence and if desired the concentration of an analyte or parameter of a test sample can be determined. For this purpose, a sample vessel comprising a test sample is placed in a sample holder which can be heated and/or cooled to predefined set-point temperatures according to a temperature profile of a test protocol. The quality of such a temperature-dependent reaction depends on the accurate heating and/or cooling of the sample holder and test sample. In particular, for a quantitative analysis of an analyte during a temperature-dependent reaction such as a nucleic acid amplification reaction a reliable execution of a temperature profile on the sample holder in a thermocycler instrument is essential. Inaccurate temperatures of the test sample holder may lead to incorrect (elevated or lowered) test results or worst case to false negative or false positive test results causing misinterpretation of test results, inappropriate further testing, and initiation of treatments with potentially hazardous outcomes for the patient. Accordingly, the temperature of the sample holder and/or the temperature of the test sample are monitored during execution of the temperature profile using temperature sensors.

However, one of the most common errors of a thermocycler instrument in the field are a defective or inaccurate temperature sensor with an offset which can lead to incorrect test results, aborts of temperature-dependent reactions, and loss of test samples. EP2739747B1 discloses a method for operating a thermocycler instrument where the temperature of the sample holder and the temperature of the heat exchanger are monitored by at least two spaced apart temperature sensors and a sensed malfunction, such as a runaway temperature condition, causes a shutdown operation of one or more electrically driven components. However, sensor failures as such which could also cause a shutdown operation are not detected. EP2949741 discloses a nucleic acid amplifying device comprising multiple temperature control wells whose temperature are monitored by temperature sensors. After detection of a sensor failure the temperature control well with a failure is removed for maintenance and is not available for further operation. Although only the sensor is defective the whole temperature control well needs to be repaired or changed resulting in increased maintenance activities, costs, and operation downtimes.

Therefore, there is a need to monitor and control the temperature of a sample holder of a laboratory instrument in a simple, reliable, and cost-efficient way. It was an object of the present disclosure to improve conventional sample holder temperature monitoring and control, particularly to better serve the needs of automated in vitro diagnostic test sample treatments.

SUMMARY

The present disclosure discloses a method, a laboratory instrument, a computer program product, and a computer-readable medium for monitoring and controlling the temperature of a sample holder of the laboratory instrument.

The present disclosure relates to a method to monitor and control the temperature of a sample holder of a laboratory instrument during execution of a temperature profile on the sample holder. The laboratory instrument comprises a sample holder with high temperature uniformity, a thermoelectric element which is in thermal contact with the sample holder, and a control device. The sample holder comprises at least three identical temperature sensors, the temperature profile comprises at least one set-point temperature, and the execution of the temperature profile on the sample holder comprises heating or cooling of the sample holder to the at least one set-point temperature for a predefined time duration and at a predefined time point. The method comprises the following steps:

a) the control device controls the thermoelectric element to heat or cool the sample holder to the at least one set-point temperature of the temperature profile b) the at least three identical temperature sensors measure at least three actual temperatures of the sample holder and transmit the at least three measured actual temperatures to the control device c) the control device compares the at least three measured actual temperatures with a predefined maximum permissible temperature deviation range from the at least one set-point temperature d) the control device calculates at least three temperature differences between each of the at least three measured actual temperatures e) the control device compares each of the at least three calculated temperature differences with a predefined maximum permissible temperature difference range f) the control device determines to continue the execution of the temperature profile on the sample holder if at least two of the measured actual temperatures are within the predefined maximum permissible temperature deviation range from the at least one set-point temperature and if at least one of the at least three calculated temperature differences is within the predefined maximum permissible temperature difference range. Or the control device determines to abort the execution of the temperature profile on the sample holder if less than two of the measured actual temperatures are within the predefined maximum permissible temperature deviation range from the at least one set-point temperature and if none of the at least three calculated temperature differences is within the predefined maximum permissible temperature difference range.

The present disclosure also relates to a laboratory instrument comprising a sample holder with high temperature uniformity, a thermoelectric element which is in thermal contact with the sample holder, and a control device. The sample holder comprises at least three identical temperature sensors. And the control device is adapted to execute the steps of the method to monitor and control the temperature of the sample holder of the laboratory instrument during execution of a temperature profile on the sample holder as described herein.

The disclosure further relates to a computer program product comprising instructions to cause the laboratory instrument as described herein to execute the steps of the method to monitor and control the temperature of the sample holder of the laboratory instrument during execution of a temperature profile on the sample holder as described herein.

The present disclosure also relates to a computer-readable medium having stored thereon the computer program product comprising instructions to cause the laboratory instrument as described herein to execute the steps of the method to monitor and control the temperature of the sample holder of the laboratory instrument during execution of a temperature profile on the sample holder as described herein.

DETAILED DESCRIPTION

The present disclosure relates to a method to monitor and control the temperature of a sample holder of a laboratory instrument during execution of a temperature profile on the sample holder. The laboratory instrument comprises a sample holder with high temperature uniformity, a thermoelectric element which is in thermal contact with the sample holder, and a control device. The sample holder comprises at least three identical temperature sensors, the temperature profile comprises at least one set-point temperature, and the execution of the temperature profile on the sample holder comprises heating or cooling of the sample holder to the at least one set-point temperature for a predefined time duration and at a predefined time point. The method comprises the following steps:
a) the control device controls the thermoelectric element to heat or cool the sample holder to the at least one set-point temperature of the temperature profile
b) the at least three identical temperature sensors measure at least three actual temperatures of the sample holder and transmit the at least three measured actual temperatures to the control device
c) the control device compares the at least three measured actual temperatures with a predefined maximum permissible temperature deviation range from the at least one set-point temperature
d) the control device calculates at least three temperature differences between each of the at least three measured actual temperatures e) the control device compares each of the at least three calculated temperature differences with a predefined maximum permissible temperature difference range
f) the control device determines to continue the execution of the temperature profile on the sample holder if at least two of the measured actual temperatures are within the predefined maximum permissible temperature deviation range from the at least one set-point temperature and if at least one of the at least three calculated temperature differences is within the predefined maximum permissible temperature difference range. Or the control device determines to abort the execution of the temperature profile on the sample holder if less than two of the measured temperatures are within the predefined maximum permissible temperature deviation range from the at least one set-point temperature and if none of the at least three calculated temperature differences is within the predefined maximum permissible temperature difference range.

As used herein, the term "laboratory instrument" relates to any pre-analytical, analytical or post-analytical instrument configured to process or treat a test sample according to a temperature profile. A pre-analytical instrument can usually be used for the preliminary processing or treatment of test samples. An analytical instrument can be designed, for example, to use a test sample or part of the test sample and a test reagent in order to produce a measurable signal, on the basis of which it is possible to determine whether the analyte is present, and if desired in what concentration. A post-analytical instrument can usually be used for the post-processing or treatment of test samples like the archiving of test samples at certain temperature conditions. The laboratory instrument may comprise, for example, at least one device from the group of following devices: a sorting device for sorting test samples or sample vessels, a cap removal device for removing caps or closures on sample vessels, a cap fitting device for fitting caps or closures on sample vessels, a cap removal/fitting device for removing/fitting caps or closures on sample vessels, a pipetting device for pipetting a test sample and/or test reagent, an aliquoting device for aliquoting test samples and/or test reagents, a centrifuging device for centrifuging test samples and/or test reagents, a thermoelectric element for heating and/or cooling a sample holder, a sample holder for holding a sample vessel containing a test sample and/or test reagent, a mixing device for mixing a test sample and/or test reagent, an isolation device for isolating an analyte of the test sample, a storing device for storing test samples and/or test reagents, an archiving device for archiving test samples and/or test reagents, a sample vessel type determination device for determining a sample vessel type, a test sample quality determination device for determining a test sample quality, a sample vessel identification device for identifying a sample vessel, a detection device for detecting an analyte of a test sample. Such laboratory instruments are well known in the art.

As used herein, the term "sample holder" relates to any device adapted for receiving, holding, and/or releasing at least one sample vessel containing a test sample and/or a test reagent. The sample holder may comprise at least one insertion area or recess configured to receive and accommodate one or more sample vessels in a manner that heat exchange with the test sample can be facilitated.

In one embodiment, the sample holder has a cylindrical shape, a closed bottom, and a top with an insertion area for inserting one sample vessel in an upright position. A non-limiting example of such a sample holder is a single sample vessel holder.

In another embodiment, the sample holder has a cubic shape, a closed bottom, and a top with one or multiple insertion areas or recesses for inserting one or multiple sample vessels in an upright position. A non-limiting example of such a cubic test sample holder is a test sample block configured to receive, hold, and/or release one or multiple sample vessels or a multi-well plate.

As used herein, the term "high temperature uniformity" means that after heating and/or cooling of the sample holder, the temperature is uniformly or equally distributed over the sample holder. Accordingly, temperatures at different positions on the sample holder are substantially the same. For example, depending on the application area of the laboratory instrument temperatures at different positions on the sample holder may vary in a range of +/−0.3° C. or +/−1° C. In particular, high temperature uniformity is important for sample holders comprising multiple insertion areas or recesses for inserting multiple sample vessels. This ensures that all test samples are exposed to a substantially same temperature which allows a comparable quantitative analysis of all the test samples.

In one embodiment of the method, the sample holder with high temperature uniformity comprises a vapor chamber. A vapor chamber is a special heat pipe for transporting and distributing heat. The term heat pipe is an established name for a sealed vacuum vessel with an inner wick structure that transfers heat by the evaporation and condensation of an internal working fluid. As heat is absorbed at one side of the heat pipe, the working fluid is vaporized, creating a pressure gradient within said heat pipe. The vapor is forced to flow to the cooler end of the heat pipe, where it condenses and dissipates its latent heat to the ambient environment. The condensed working fluid returns to the evaporator via gravity or capillary action within the inner wick structure. A vapor chamber may be designed as described in U.S. Pat. No. 9,149,809B2 reference number 12 in FIGS. 1 to 4 and corresponding description.

In an alternative embodiment, the sample holder with high temperature uniformity is an assembly comprising a thermal block and a vapor chamber. The thermal block may have a cubic shape and may comprise one or multiple insertion areas or recesses for inserting one or multiple sample vessels or a multi-well plate in an upright position. The thermal block may be made out of materials like copper, aluminum, silver or graphite. The thermal block may be mounted on the vapor chamber and may be in thermal contact with the vapor chamber having a substantially planar shape. The thermal block and the vapor chamber of the sample holder may be designed as described in EP1710017A1, reference numbers 1, 4 and 6 in FIG. 1 and corresponding description.

As used herein, the term "temperature profile" relates to a predefined temporal course of set-point temperatures to which the sample holder is heated/cooled or at which the sample holder temperature is maintained for a predefined time duration. The temperature profile comprises at least one predefined set-point temperature to which the sample holder is heated or cooled for a predefined time duration and at a predefined time point. And the execution of the temperature profile on the sample holder comprises heating or cooling of the sample holder to the at least one set-point temperature for a predefined time duration at a predefined time point using a thermoelectric element controlled by a control device. Thus, the execution of the temperature profile may comprise heating or cooling of the sample holder at a predefined time point for reaching a predefined set-point temperature and heating or cooling of the sample holder for maintaining the sample holder temperature at the reached predefined set-point temperature for a predefined time duration. The set-point temperature may be a temperature at which certain sample processing steps such as pre-analytical, analytical or post-analytical sample processing steps are supported or enabled. For example, certain temperature-dependent reactions such as chemical reactions, enzymatic reactions, or microbiological reactions may take place only at certain temperatures or may be more efficient at certain temperatures. Furthermore, the set-point temperature may be a temperature at which the function of the thermoelectric element and/or sample holder is tested. For accurate temperature-dependent reactions and functional tests the actual sample holder temperature may not deviate from a predefined maximum permissible temperature deviation range defined by an upper and lower temperature limit around a set-point temperature.

In one embodiment, the temperature profile may comprise only one set-point temperature. For example, the sample holder is heated by the thermoelectric element to a predefined set-point temperature (e.g. 95° C.) for a predefined time duration (e.g. 10 Seconds) at a predefined time point (e.g. time point=0 seconds on a time axis of the temperature profile). And afterwards, the sample holder cools down to room temperature without the support of the thermoelectric element.

In another embodiment, the temperature profile may comprise two set-point temperatures. For example, the sample holder is heated by the thermoelectric element to a first predefined set-point temperature (e.g. 37° C.) for a first predefined time duration (e.g. 3 hours) at a first predefined time point (e.g. time point=0 seconds on the time axis of the temperature profile). During the first predefined time duration a temperature-depend reaction may take place. Afterwards, at a second predefined time point (e.g. after the first predefined time duration) the sample holder is cooled by the thermoelectric element to a second predefined set-point temperature (e.g. 4° C.) for a predefined time duration (e.g. 24 hours).

In a further embodiment, the temperature profile comprises three or more set-point temperatures. For example, the sample holder is heated by the thermoelectric element to a first predefined set-point temperature (e.g. 95° C.) for a first predefined time duration (e.g. 30 seconds) at a first predefined time point (e.g. time point=0 seconds on the time axis of the temperature profile). Then, the sample holder is cooled by the thermoelectric element to a second predefined set-point temperature (e.g. 65° C.) for a second predefined time duration (e.g. 30 seconds) at a second predefined time point (e.g. after the first time duration). Subsequently, the sample holder is heated by the thermoelectric element to a third predefined set-point temperature (e.g. 72° C.) for a third predefined time duration (e.g. 2 minutes) at a third predefined time point (e.g. after the second time duration). The sequence of the first predefined set-point temperature for the first time duration, the second predefined set-point temperature for the second time duration, and the third predefined set-point temperature for the third time duration may define a cycle of the temperature profile during which one or multiple temperature-dependent reactions may take place. And during the execution of the temperature profile this cycle of the temperature profile may be repeated multiple times (e.g. forty times) before the sample holder is cooled by the thermoelectric element to a fourth predefined set-point temperature (e.g. 4° C.) for a predefined time duration (e.g. 24 hours) at a fourth predetermined time point (e.g. after the third time duration of the last cycle of the temperature profile).

As used herein, the term "thermoelectric element" relates to a device for heating and active cooling of the sample holder. Thus, the thermoelectric element is used as a temperature controller that either heats or cools the sample holder of the laboratory instrument to at least one set-point temperature according to a predefined temperature profile. Thermoelectric elements are solid-state heat pumps made from semiconductor materials comprising a series of p-type and n-type semiconductor pairs or junctions sandwiched between ceramic plates or other insulating materials. Heat is absorbed by electrons at the cold junction as they pass from a low energy level in a p-type element to a higher energy level in an n-type element. At the hot junction, energy is expelled to e.g. a heat sink as the electrons move from the high-energy n-type element to a low-energy p-type element. A dc power supply provides the energy to move the electrons through the system. The amount of heat pumped is proportional to the amount of current flowing through the thermoelectric element and therefore, tight temperature control is possible. By reversing the current, thermoelectric elements can function as heaters or coolers, which can be useful in controlling the execution of a temperature profile on a sample holder. Because of the relatively large amount of heat being pumped over a small area, thermoelectric elements in general require a heat sink to dissipate the heat into the ambient environment. A well-known type of thermoelectric elements is the Peltier elements.

In a more specific embodiment, the thermoelectric element comprises an electrodeposited thermoelectric element. An electrodeposited thermoelectric element relates to a thermoelectric element made or manufactured by electrodeposition of the p-type and n-type elements. Electrodeposition is a processes which includes electrocoating, e-coating, cathodic electrodeposition, anodic electrodeposition, and electrophoretic coating, or electrophoretic painting. A characteristic feature of this process is that colloidal particles suspended in a liquid medium migrate under the influence of an electric field (electrophoresis) and are deposited onto an electrode. All colloidal particles that can be used to form stable suspensions and that can carry a charge can be used in electrophoretic deposition. This includes materials such as polymers, pigments, dyes, ceramics and metals. The process is useful for applying materials to any electrically conductive surface. As electrodeposition enables a highly granular arrangement of the p-type and n-type elements electrodeposited thermoelectric element have a high flexibility and may be individually shaped with rather low effort. An electrodeposited thermoelectric element may be designed as described in EP3290119A1 reference number 48 in FIGS. 1 to 8 and corresponding description.

In one embodiment, the laboratory instrument further comprises a heat sink. The heat sink may be in thermal contact with the thermoelectric element. And the electrodeposited thermoelectric element may be disposed between the sample holder and the heat sink. Thus, heat may be removed from the sample holder and transferred to the heat sink. A heat sink may be designed as described in EP3290119A1 reference number 30 in FIGS. 1, 2, 3, 4, 6, 7, 8 and corresponding description.

The term "control device" as used herein encompasses any physical or virtual processing device comprising a processor which is configured to control the laboratory instrument in a way that test sample processing steps are conducted by the laboratory instrument. The processor of the control device may, for example, instruct the laboratory instrument to conduct pre-analytical, post-analytical and analytical test sample processing steps. The control device may receive information from a data management unit regarding which steps need to be performed with a certain test sample. The processor of the control device may, for instance, be embodied as a programmable logic controller adapted to execute a computer-readable program provided with instructions to perform operations of the laboratory instrument. One example of such an operation is to control a thermoelectric element in order to heat or cool a sample holder to at least one set-point temperature of the temperature profile for a predefined time duration and at a predefined time point. A further example of such an operation is to conduct a method for monitoring and controlling the temperature of a sample holder of the laboratory instrument as described further herein.

As used herein, the term "temperature sensor" relates to a device configured to detect and/or measure a temperature. The temperature sensor may be a mechanical or electrical temperature sensor. Non-limiting examples of electrical temperature sensors are thermistors, thermocouples, resistance thermometers, or silicon bandgap temperature sensor. Such electrical temperature sensors are well known in the art. The temperature sensor may be mounted on or attached to the sample holder. For example, the temperature sensor may be attached at the surface of the sample holder by any suitable means, such as for example glue or mechanical fastener elements (e.g. screws) so that the temperature sensor is in direct contact with the sample holder for a reliable measuring of the current sample holder temperature.

As used herein, the term "predefined maximum permissible temperature deviation range" relates to a temperature range defined by an upper and lower temperature limit around a set-point-temperature. The predefined maximum permissible temperature deviation range may depend on the configuration of the sample holder and/or thermoelectric element. For example, the predefined maximum permissible temperature deviation range is +/−5° C. of a set-point-temperature. An actual temperature measured by a temperature sensor which is outside of the predefined maximum permissible temperature deviation range indicates a defect of the corresponding temperature sensor and this temperature sensor may be excluded from further monitoring and/or controlling the temperature of a sample holder of the laboratory instrument.

The sample holder with high temperature uniformity comprises at least three identical temperature sensors within the scope of general manufacturing accuracies of the temperature sensors. Accordingly, the at least three identical temperature sensors measure three substantially same temperatures in a normal operating state. In order to identify and/or exclude a temperature sensor with an offset from monitoring and controlling the temperature of a sample holder of a laboratory instrument during execution of a temperature profile on the sample holder, at least three temperature differences between each of the at least three measured actual temperatures of the at least three identical temperature sensors are calculated and compared with a predefined maximum permissible temperature difference range. In one embodiment of the method, the at least three calculated temperature differences are absolute temperature differences. For example, all calculated temperature differences from the measured actual temperatures comprise a value which may be within a predefined maximum permissible temperature difference range, e.g. within a range of 1°

C. An actual temperature measured by a temperature sensor for which at least two calculated temperature differences are outside of the predefined maximum permissible temperature difference range indicates an offset of this temperature sensor. And this temperature sensor may then be excluded from further monitoring and/or controlling the temperature of a sample holder of the laboratory instrument. Also an actual temperature measured by a temperature sensor which is inside of the predefined maximum permissible temperature deviation range but for which at least two calculated temperature differences are outside of the predefined maximum permissible temperature difference range indicates an offset of this temperature sensor. And this temperature sensor may then also be excluded from further monitoring and/or controlling the temperature of a sample holder of the laboratory instrument. Thus, for a reliable monitoring and controlling of the temperature of a sample holder of a laboratory instrument during execution of a temperature profile on the sample holder, at least two of the measured temperatures may be within the predefined maximum permissible temperature deviation range from the at least one set-point temperature and at least one of the at least three calculated temperature differences may be within the predefined maximum permissible temperature difference range. Both requirements are fulfilled as long as at least two temperature sensors are working correctly. If less than two of the measured temperatures are within the predefined maximum permissible temperature deviation range from the at least one set-point temperature and if none of the at least three calculated temperature differences is within the predefined maximum permissible temperature difference range, the execution of the temperature profile on the sample holder may be aborted as no reliable monitoring and controlling of the temperature of a sample holder of a laboratory instrument is ensured.

In one embodiment of the method, steps a) to f) are repeated when the control device determines to continue execution of the temperature profile on the sample holder or starts execution of a subsequent temperature profile on the sample holder. Accordingly, the temperature of a sample holder of a laboratory instrument can be monitored and controlled continuously during execution of a temperature profile on the sample. As a temperature-dependent reaction of a test sample may be very temperature sensitive, a continuous monitoring and controlling of the sample holder temperature assures the quality of the test result derived from such a sensitive temperature-dependent test sample reaction.

In a further embodiment of the method, one of the at least three identical temperature sensors is excluded from the repetition of steps a) to f) when the measured temperature of said temperature sensor is outside of the predefined maximum permissible temperature range or results in at least two calculated temperature differences which are not within the predefined maximum permissible temperature difference range.

When the measured temperature of a temperature sensor is outside the predefined maximum permissible temperature deviation range, the temperature sensor may be defective. The defective temperature sensor may be excluded and the remaining temperature sensors may continue to monitor and/or control the temperature of a sample holder of a laboratory instrument during execution of a temperature profile. Accordingly, only functioning temperature sensors contribute to a reliable monitoring and/or controlling of the temperature of a sample holder and a defective temperature sensor may not necessarily trigger an abort of the temperature profile. This may be advantageous if important and urgent test samples (e.g. short turnaround time test samples) are processed according to a temperature profile in a sample holder. Therefore, the present method assures that test results are provided on time. Furthermore, this may also be advantageous if valuable test samples (e.g. test sample for which only a small and limited volume is available) are processed according to a temperature profile in a sample holder and an abort would result in complete test sample loss.

When the measured actual temperature of a temperature sensor results in at least two calculated temperature differences which are not within the predefined maximum permissible temperature difference range, the temperature sensor may have an offset and may not measure the sample holder temperature sufficiently accurate anymore. The temperature sensor with offset can be excluded and the remaining temperature sensors may continue to monitor and/or control the temperature of a sample holder of a laboratory instrument during execution of a temperature profile. Accordingly, only temperature sensors without offsets contribute to a reliable monitoring and/or controlling the temperature of a sample holder and a temperature sensor with offset may not necessarily trigger an abort of the temperature profile. Thus, test results from urgent test samples which are processed according to a temperature profile can be provided on time. Furthermore, a loss of a valuable test sample which is processed according to a temperature profile may be prevented.

In a further embodiment of the method, the sample holder comprises four identical temperature sensors. With this configuration of the sample holder up to two temperature sensors may break down or develop an offset bevor the accuracy and reliability of the monitoring and controlling of the temperature of a sample holder during execution of a temperature profile on the sample holder may not be ensured anymore. Accordingly, the operation time of the laboratory instrument may be extended before maintenance activities or replacement of the sample holder and/or temperature sensors are required.

In one embodiment of the method, the control device further comprises a user interface. If the number of remaining temperature sensors decreases to two temperature sensors, a user notification is indicated via the user interface. The user interface may be a display or screen on which the user notification is displayed. Alternatively, the user interface may be a lamp (e.g. a light emitting diode) which is activated if the number of remaining temperature sensors decreases to two temperature sensors. Accordingly, the user is informed about the current status of the sample holder and the at least three temperature sensors and may initiate adequate measures. For example, the user may initiate preventive maintenance activities (e.g. ordering of a new sample holder for replacement or replacement of the sample holder) or the user may keep the sample holder in operation as the remaining temperature sensors may continue to monitor and/or control reliably the temperature of a sample holder of a laboratory instrument during execution of a temperature profile.

In a more specific embodiment, the user interface is a display and the user notification is displayed on the display. The user notification comprises a prompt for preventive maintenance, a warning indicating that exclusion of a further temperature sensor will result in an immediate abort of execution of the temperature profile on the sample holder, or a user interface control element which can be selected by a user in order to continue the execution of the temperature profile on the sample holder or to start a subsequent temperature profile on the sample holder, or a combination thereof.

As used herein, the term "preventive maintenance" relates to maintenance activities which are regularly performed by a user or automatically by the laboratory instrument on a part or piece of the laboratory instrument in order to reduce the likelihood of it failing. Preventive maintenance is performed while the laboratory instrument is still functional, so that it does not break down unexpectedly. A non-limiting example of a preventive maintenance activity is the exchange of a spare part like a sample holder by a user.

As used herein, the term "user interface control element" relates to any graphical element of a user interface enabling an interaction between a user and the laboratory instrument by selecting or activating the element. For example, the user interface control element may be a selectable button for confirming/declining of displayed notifications or for starting, continuing, or stopping any operations of the laboratory instrument.

In one embodiment of the method, the temperature profile is executed on the sample holder for performing a temperature-dependent reaction of a test sample. The sample holder comprises at least one recess which is configured to receive a sample vessel comprising a test sample. Prior to step a) of the method the at least one sample vessel comprising the test sample is inserted into the at least one recesses.

As used herein, the term "temperature-dependent reaction" relates to a reaction or process for developing a detectable signal associated with an analyte or analyte-related parameter of a test sample under predefined temperature conditions. Typically, a test sample is mixed with a test reagent and incubated for a predefined time duration at a predefined test sample temperature which is associated with a predefined set-point temperature of a temperature profile. The test reagent comprises a substance or solution that reacts with an analyte or analyte-related substance for developing a detectable signal, wherein the test sample temperature supports or enables the reaction. Non-limiting examples of temperature dependent-reactions are chemical test reactions, immunological test reactions, enzymatic test reactions, molecular biological test reactions, dye stainings, coagulation test reactions, agglutination test reactions.

As used herein, the term "sample vessel" relates to a container or receptacle adapted for receiving, storing, transporting, and/or releasing a content such as a test sample (e.g. blood, urine, serum, plasma, or liquefied biopsy sample, etc.), a test reagent (e.g. reagent for immunochemistry tests, clinical chemistry tests, coagulation tests, hematological tests, molecular biological tests, etc.), or a combination thereof. Depending on the content of the sample vessel, sample processing step, and manufacturer the material as well as the dimension of the sample vessel like diameter, side length, height and geometry varies.

In one embodiment, the sample vessel may be a vessel with a cylindrical, conical or cubic shape. The sample vessel may have a closed bottom and an open top. The closed bottom of the cylindrical vessel can be rounded and the open top may be closable, e.g. by using a cap. A non-limiting example of a single cylindrical or conical separation vessel is a primary or secondary sample vessel which is well known in the art. Alternatively, two or more sample vessels may be arranged as a multi sample vessel assembly. A non-limiting example of such a multi sample vessel assembly is a multiwell plate which is well known in the art.

In a more specific embodiment of the method, the temperature-dependent reaction of the test sample comprises heating or cooling of the test sample to at least one predefined test sample temperature for a predefined time duration, wherein the at least one predefined test sample temperature and the at least one set-point temperature of the temperature profile is the same or different. For example, the optimal test sample temperature for a certain temperature-dependent reaction is 72° C. Depending on the conditions in the interior of the laboratory instrument, configuration of the sample holder and used sample vessels, the set-point temperature to which the sample holder is heated may be slightly higher (e.g. 72.5° C.) than the optimal test sample temperature in order to achieve this optimal test sample temperature.

In a further specific embodiment of the method, the temperature-dependent reaction of the test sample is a nucleic acid amplification reaction.

As used herein, the term "nucleic acid amplification reaction" relates to a method or reaction used in molecular biology to amplify a single copy or a few copies of a DNA segment to a detectable amount of copies of the DNA segment involving repeated temperature-dependent reactions with a polymerase. One such temperature-dependent reaction may take place during the execution of one cycle of the temperature profile on the sample holder. And each cycle of the temperature profile may comprise at least three discrete set-point temperatures. For example, each cycle of the temperature profile may comprise a first set-point-temperature and a first time duration for the denaturation phase (e.g. 95° C. for 30 seconds), a second set-point-temperature and a second time duration for the annealing phase (e.g. 65° C. for 30 seconds), and a third set-point-temperature and a third time duration for the extension phase (e.g. 72° C. for 2 minutes) of the nucleic acid amplification reaction. Typically, a temperature profile of a nucleic acid amplification reaction consists of 20-40 repeated cycles until a detectable amount of copies of the DNA segment is generated. The detection of the copies of the DNA segment can be done after the nucleic acid amplification reaction is completed or during the nucleic acid amplification reaction in real-time. Laboratory instruments for conducting such nucleic acid amplification reactions are typically called thermocycler instruments and are well known in the art.

In one embodiment of the method, the temperature profile is executed on the sample holder for performing a functional test of the thermoelectric element and sample holder, wherein the method is executed during the startup of the laboratory instrument, wherein the temperature profile comprises only one set-point temperature. As used herein, the term "functional test" relates to an automated test of the laboratory instrument for testing the functionality of various components or devices of the laboratory instrument before test samples are processed on the laboratory instrument. For example, the function of the thermoelectric element and sample holder for heating and/or cooling test samples and/or test reagents may be tested before a temperature-dependent reaction is conducted on the laboratory system. If such a functional test fails a user may initiate and conduct adequate maintenance activities to ensure a reliable operation of the laboratory instrument later on.

In a further embodiment of the method, the control of the thermoelectric element in step a) comprises the following sub-steps if the control device determines to continue the execution of the temperature profile on the sample holder in step f):

g) the control device calculates an average of the at least two measured actual temperatures which are within the predefined maximum permissible temperature deviation range from the at least one set-point temperature and result in at least one calculated temperature difference which is within the predefined maximum permissible temperature difference range h) the control device compares the calculated average of the at least two measured actual temperatures with the at least one set-point temperature of the temperature profile i) the control device determines a deviation between the calculated average of the at least two measured actual temperatures and the at least one set-point temperature of the temperature profile j) the control device adjusts heating or cooling of the thermoelectric element according to the determined deviation between the calculated average of the at least two measured actual temperatures and the at least one set-point temperature of the temperature profile.

Thus, the measured actual temperature of each functioning sensor is used for controlling the thermoelectric element which results in a more accurate heating and/or cooling of the sample holder by the thermoelectric element. Furthermore, even if a temperature sensor fails the remaining temperature sensors may continue to control the thermoelectric element reliably and a defective temperature sensor or a temperature sensor with an offset may not necessarily trigger an abort of the temperature profile. Accordingly, a delayed availability of test results derived from urgent test samples or complete loss of valuable test samples can be prevented.

In an alternative embodiment, the laboratory instrument further comprises at least one test sample temperature probe for measuring the actual test sample temperature in at least one sample vessel during execution of a temperature profile on the sample holder. Alternatively or in addition to the measured actual temperatures of the sample holder, the at least one measured actual test sample temperature may be used for controlling heating or cooling of the sample holder by the thermoelectric element. Thus, in an alternative embodiment of the method, the control of the thermoelectric element in step a) comprises the following sub-steps if the control device determines to continue the execution of the temperature profile on the sample holder in step f):

k) the control device calculates an average of the at least one measured actual test sample temperature l) the control device compares the calculated average of the at least one measured actual test sample temperature with the at least one set-point temperature of the temperature profile or with the at least one predefined test sample temperature m) the control device determines a deviation between the calculated average of the at least one measured actual test sample temperature and the at least one set-point temperature of the temperature profile or the at least one predefined test sample temperature n) the control device adjusts heating or cooling of the thermoelectric element according to the determined deviation between the calculated average of the at least one measured actual test sample temperature and the at least one set-point temperature of the temperature profile or the at least one predefined test sample temperature.

The present disclosure also relates to a laboratory instrument comprising a sample holder with high temperature uniformity, a thermoelectric element which is in thermal contact with the sample holder, and a control device. The sample holder comprises at least three identical temperature sensors. And the control device is adapted to execute the steps of the method to monitor and control the temperature of the sample holder of the laboratory instrument during execution of a temperature profile on the sample holder as described herein.

Figure 1:
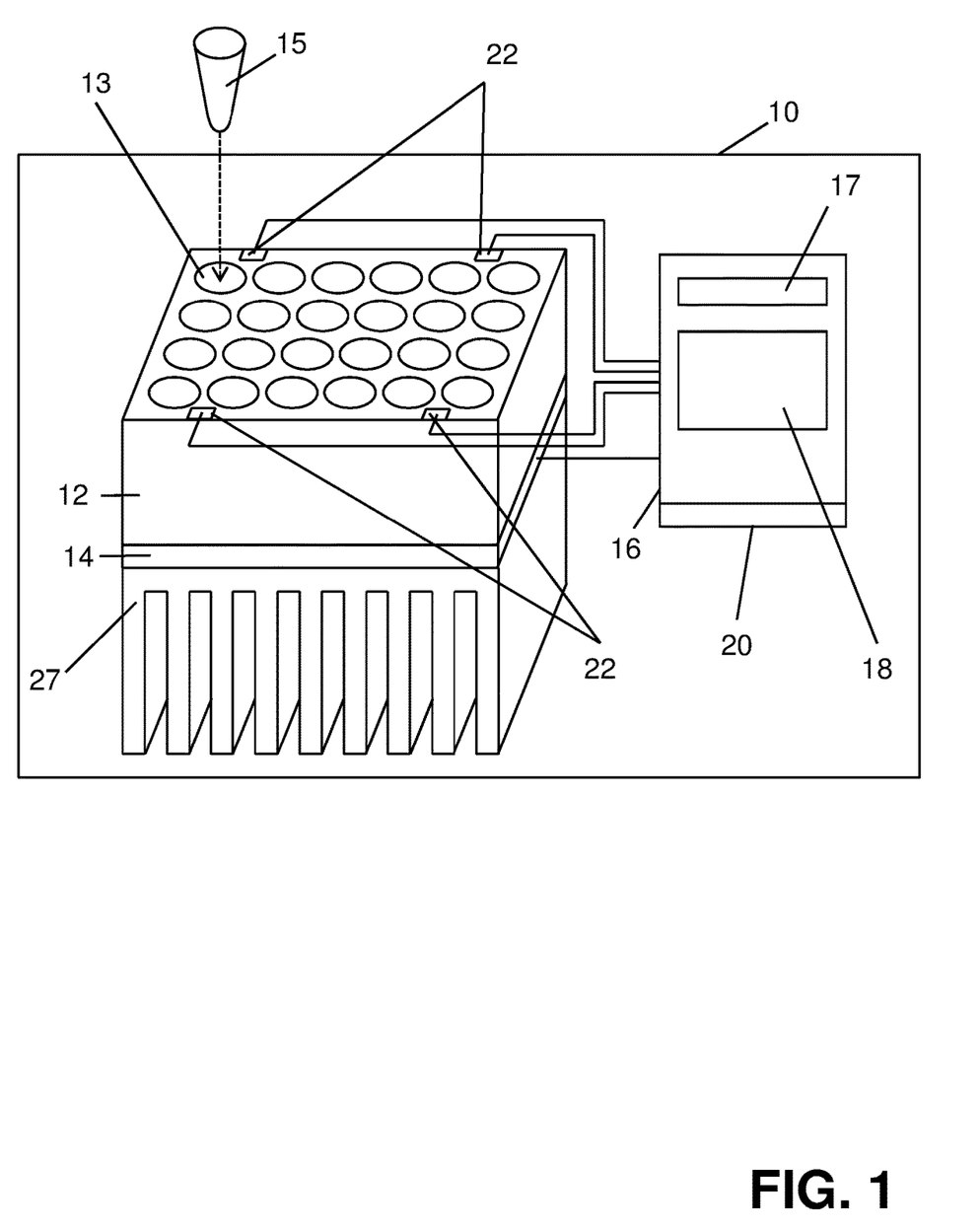
FIG. 1 shows an embodiment of a laboratory instrument.
Figure 4A:
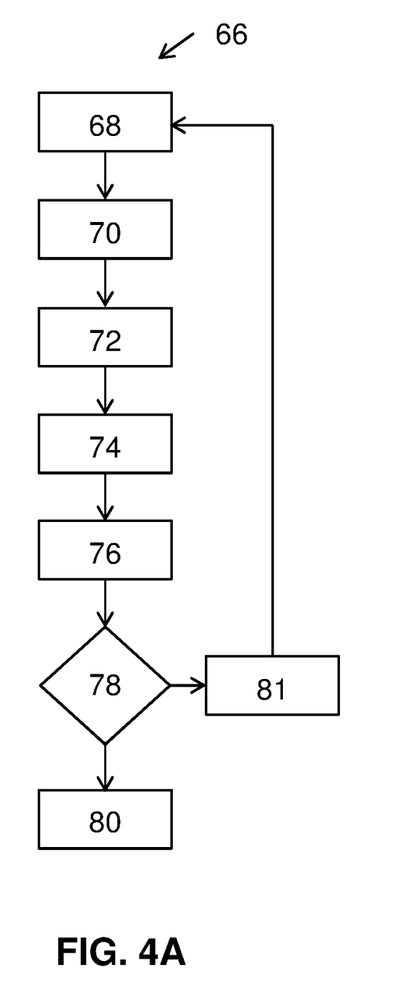
FIGS. 4A-4B depict flowcharts of embodiments of the method for monitoring and controlling the temperature of a sample holder of a laboratory instrument.
Figure 4B:
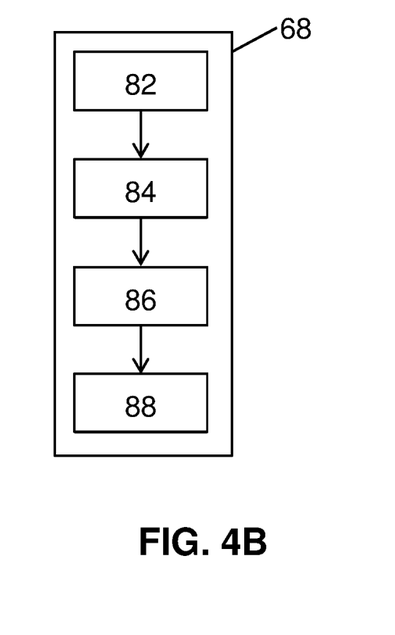

In FIG. 1 a schematic representation of a laboratory instrument (10) is shown. The laboratory instrument (10) comprises a sample holder (12) with high temperature uniformity, a thermoelectric element (14) which is in thermal contact with the sample holder (12), and a control device (16). In the shown example the sample holder (12) comprises four identical temperature sensors (22). The four temperature sensors (22) are communicatory connected to the control device (16) for transmitting measured actual temperatures of the sample holder (12) from the four identical temperature sensors (22) to the control device (16). The control device (16) is communicatory connected to the thermoelectric element (14) for controlling the thermoelectric element (14) to heat or cool the sample holder (12) to the at least one set-point temperature (34, 40, 46, 52, 58) of a temperature profile (28). The control device (16) further comprises a processor (17) and a computer-readable medium (18) having stored thereon a computer program product comprising instructions to cause the control device (16) of the laboratory instrument (10) to execute the steps (68, 70, 72, 74, 76, 78, 80, 81, 82, 84, 86, 88) of the method (66) as further described in FIG. 4. The control device (16) may further comprise a user interface (20) on which a user notification can be displayed in case the number of remaining temperature sensors for monitoring and/or controlling the temperature of the sample holder (12) decreases to two temperature sensors (22). Such a user notification may comprise a prompt for preventive maintenance, a warning indicating that exclusion of a further temperature sensor (22) will result in an immediate abort (80) of execution of the temperature profile (28) on the sample holder (12), or a user interface control element which can be selected by a user in order to continue (81) the execution of the temperature profile (28) on the sample holder (28) or to start a subsequent temperature profile on the sample holder (12).

The shown sample holder (12) comprises twenty-four recesses (13) which are configured to receive at least one sample vessel (15) comprising a test sample as indicated by the dashed arrow in FIG. 1. The laboratory instrument (10) may further comprise a heat sink (27) which is in thermal contact with the thermoelectric element (14). In the shown laboratory instrument (10) the thermoelectric element (14) is disposed between the sample holder (12) and the heat sink (27) for removing heat from the sample holder (12) and transferring the heat to the heat sink (27).

Figure 2A:
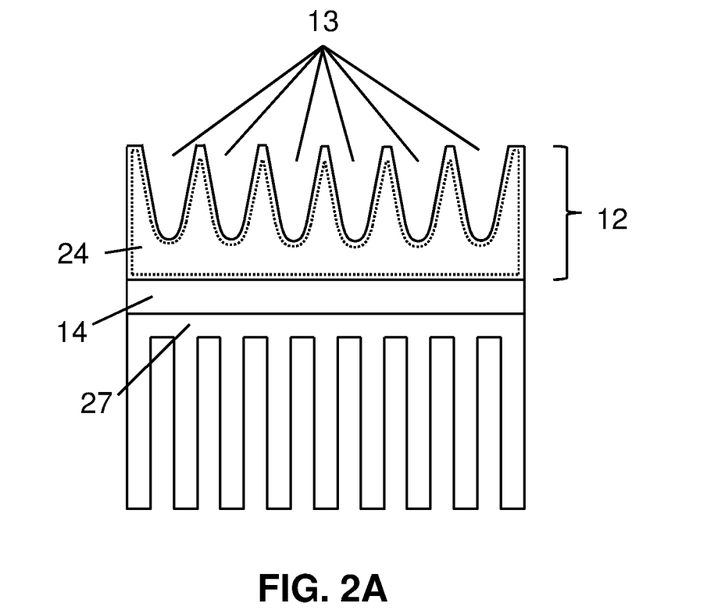
FIGS. 2A-2B depict embodiments of sample holders.
Figure 2B:
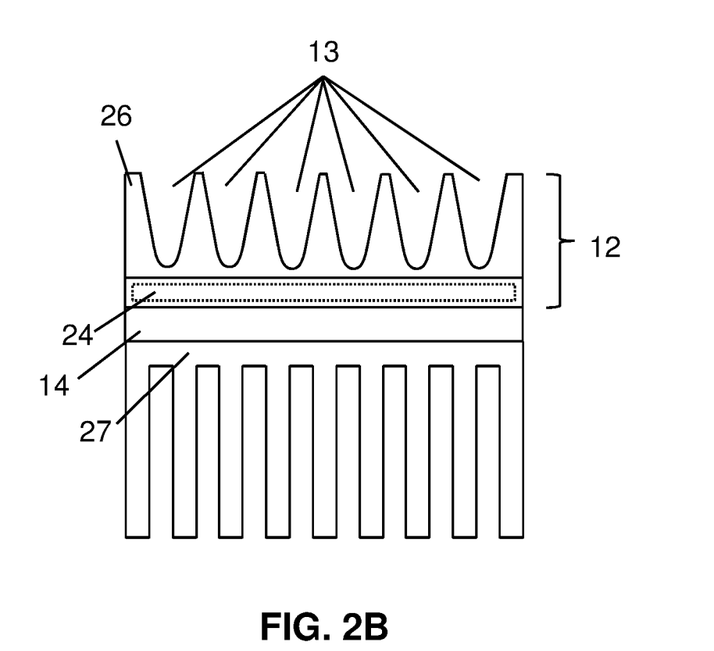

FIG. 2A-B depicts schematic side-views of two different embodiments of a sample holder (12) with high temperature uniformity. As shown in FIG. 2A the sample holder (12) with high temperature uniformity comprises a vapor chamber (24). The shown vapor chamber has a cubic shape and comprises insertion areas or recesses (13) on the top for inserting one or multiple sample vessels (15) in an upright position. The vapor chamber (24) is in thermal contact with a thermoelectric element (14). And the thermoelectric element (14) is in between the vapor chamber (24) and the heat sink (27).

FIG. 2B shows an alternative embodiment of the sample holder (12) with high temperature uniformity which may be an assembly comprising a thermal block (26) and a vapor chamber (24). The thermal block (26) may be a solid cuboid comprising multiple insertion areas or recesses (13) on top for inserting one or multiple sample vessels (15) in an upright position. The thermal block (26) may be made out of metal, e.g. aluminum or silver. The thermal block (26) is mounted on the vapor chamber (24) and in thermal contact with the vapor chamber (24) which has a substantially planar shape and is preferably free of recesses. The shown vapor chamber (24) is in thermal contact with a thermoelectric element (14) and the thermoelectric element (14) is disposed between the vapor chamber (24) and the heat sink (27).

Figure 3A:
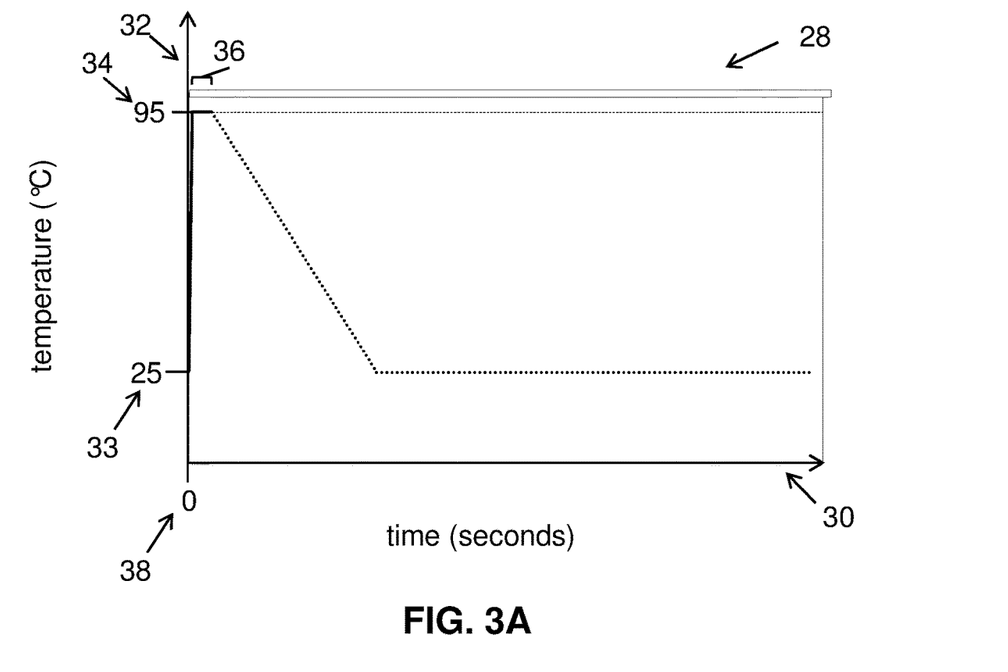
FIGS. 3A-3C show embodiments of temperature profiles.
Figure 3B:
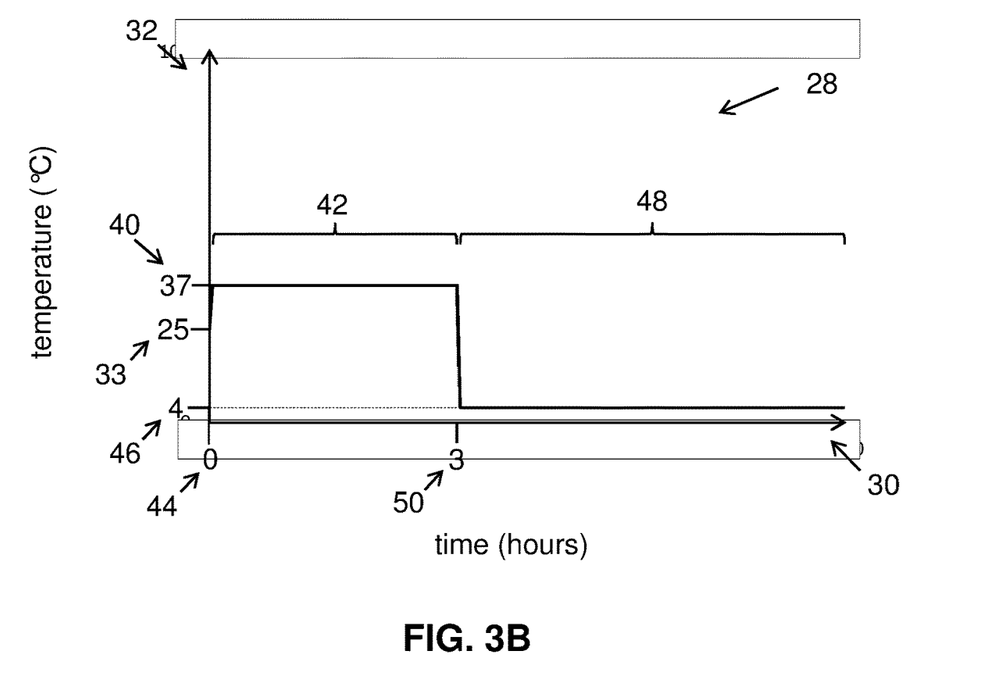
Figure 3C:
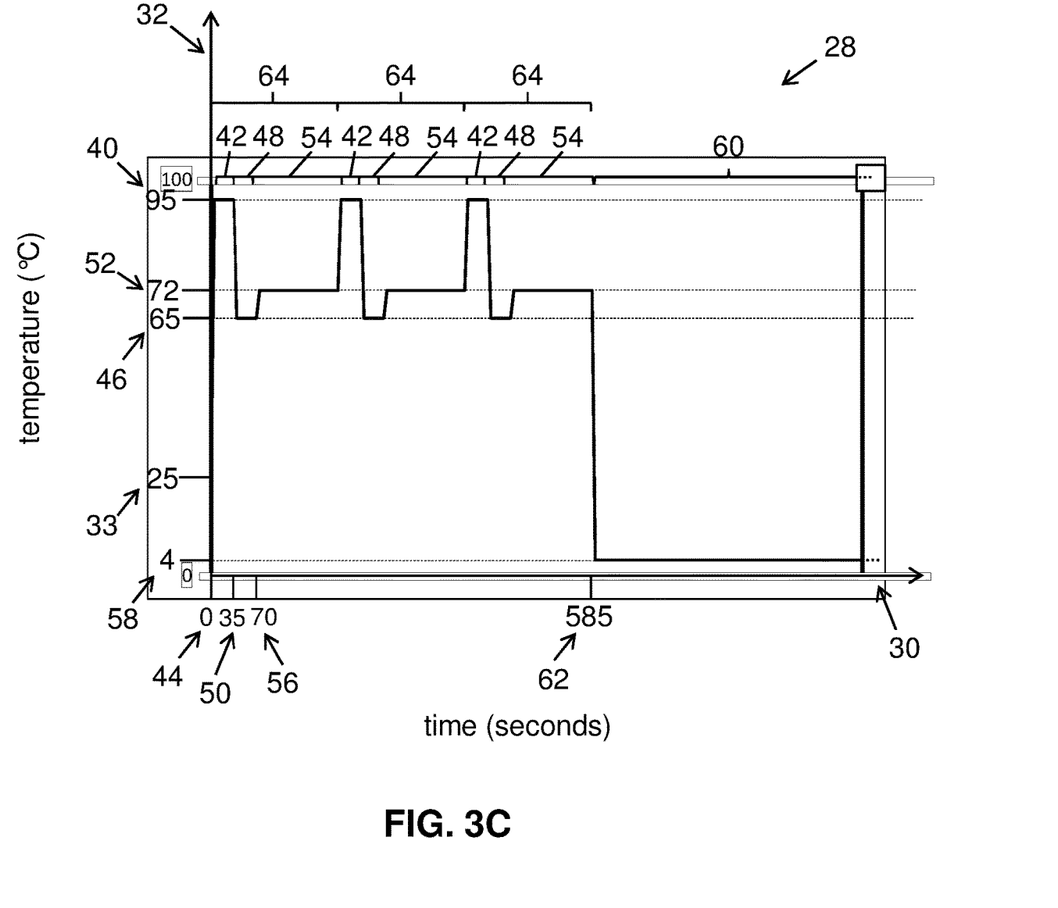

FIG. 3A-C shows embodiments of temperature profiles (28) which are predefined temporal courses of set-point temperatures (34, 40, 46, 52, 58) to which the sample holder (12) is heated/cooled by the thermoelectric element (12) over time. The shown temperature profiles (28) are illustrated as two-dimensional graphs defined by a temperature axis (32) and a time axis (30) which are perpendicularly aligned with respect to each other. As shown in FIG. 3A-C a temperature profile comprises at least one set-point temperature (34, 40, 46, 52, 58) to which the sample holder (12) is heated or cooled for a predefined time duration (36, 42, 48, 54, 60) and at a predefined time point (38, 44, 50, 56, 62), wherein heating or cooling to the at least one set-point temperature takes for example 5 seconds. The temperature profile (28) shown in FIG. 3A comprises only one predefined set-point temperature (34). The sample holder (12) is heated by the thermoelectric element (14) from room temperature (33), e.g. 25° C., to a predefined set-point temperature (34), e.g. 95° C., for a predefined time duration (36), e.g. 30 seconds, at a predefined time point (38), e.g. 0 seconds on the time axis of the temperature profile (30). Such a short temperature profile (28) may be executed for a functional test of the thermoelectric element (14) and sample holder (12) during the startup of the laboratory instrument (10). After the predefined time duration (36), the sample holder (12) cools down to room temperature (33), e.g. 25° C., without the support of the thermoelectric element (14) as indicated by the dotted line in FIG. 3A.

As indicated in FIG. 3B, the temperature profile (28) may comprise two set-point temperatures (40, 46). The sample holder (12) is heated by the thermoelectric element (14) from room temperature (33), e.g. 25° C., to a first predefined set-point temperature (40), e.g. 37° C., for a first predefined time duration (42), e.g. 3 hours, at a first predefined time point (44), e.g. 0 seconds on the time axis of the temperature profile (30). During the first predefined time duration (42) a temperature-depend reaction may take place. Afterwards, at a second predefined time point (50), e.g. after the first predefined time duration (42), the sample holder (12) is cooled by the thermoelectric element (14) to a second predefined set-point temperature (46), e.g. 4° C., for a second predefined time duration (48), e.g. 4.7 hours.

During execution of the temperature profile as shown in FIG. 3C, the sample holder (12) is heated by the thermoelectric element (14) from room temperature (33), e.g. 25° C., to a first predefined set-point temperature (40), e.g. 95° C., for a first predefined time duration (42), e.g. 30 seconds, at a first predefined time point (44), e.g. 0 seconds on the time axis of the temperature profile (30). Then, the sample holder (12) is cooled by the thermoelectric element (14) to a second predefined set-point temperature (46), e.g. 65° C., for a second predefined time duration (48), e.g. 30 seconds, at a second predefined time point (50), e.g. after the first time duration (42). Subsequently, the sample holder (12) is heated by the thermoelectric element (14) to a third predefined set-point temperature (52), e.g. 72° C., for a third predefined time duration (54), e.g. 2 minutes, at a third predefined time point (56), e.g. after the second time duration (48). The sequence of the first predefined set-point temperature (40) for the first time duration (42), the second predefined set-point temperature (46) for the second time duration (48), and the third predefined set-point temperature (52) for the third time duration (54) may define a cycle (64) of the temperature profile during which one or multiple temperature-dependent reactions may take place. The temperature profile (38) may comprise multiple repetition of this cycle (64), e.g. three times as show in FIG. 3C, before the sample holder (12) is cooled by the thermoelectric element (14) to a fourth predefined set-point temperature (58), e.g. 4° C., for a fourth predefined time duration (60), e.g. 24 hours, at a fourth predetermined time point (62), e.g. after the third time duration (54) of the last cycle (64) of the temperature profile.

FIG. 4A-B depicts flowcharts of embodiments of the method (66) for monitoring and controlling the temperature of a sample holder (12) of a laboratory instrument (10) during execution of a temperature profile (28) on the sample holder (12).

As shown in FIG. 4A, the control device (16) of the laboratory instrument (10) controls the thermoelectric element (14) to heat or cool the sample holder (12) to at least one set-point temperature (34, 40, 46, 52, 58) of the temperature profile (28) in step a) (68) of the method. Then, in step b) (70) of the method at least three identical temperature sensors (22) of the sample holder (12) measure at least three actual temperatures of the sample holder (12) and transmit the at least three measured actual temperatures to the control device (16). In step c) (72) of the method the control device (16) compares the at least three measured actual temperatures with a predefined maximum permissible temperature deviation range from the at least one set-point temperature (34, 40, 46, 52, 58). In step d) (74) of the method the control device (16) calculates at least three temperature differences between each of the at least three measured actual temperatures. Afterwards, the control device (16) compares each of the at least three calculated temperature differences with a predefined maximum permissible temperature difference range in step e) (76) of the method. In step f) (78) of the method the control device (16) determines to continue (81) or to abort (80) the execution of the temperature profile (28) on the sample holder (12). The control device (16) determines to abort (80) the execution of the temperature profile (28) on the sample holder (12) if less than two of the measured actual temperatures are within the predefined maximum permissible temperature deviation range from the at least one set-point temperature and if none of the at least three calculated temperature differences is within the predefined maximum permissible temperature difference range. Or the control device (16) determines to continue (81) the execution of the temperature profile (28) if at least two of the measured actual temperatures are within the predefined maximum permissible temperature deviation range from the at least one set-point temperature and if at least one of the at least three calculated temperature differences is within the predefined maximum permissible temperature difference range. When the control device (16) determines to continue (81) execution of the temperature profile (28) on the sample holder (12) or starts execution of a subsequent temperature profile on the sample holder (12) step a) (68), step b) (70), step c) (72), step d) (74), step e) (76), and step f) (78) are repeated for a continuous monitoring and controlling of the temperature of the sample holder (12) of the laboratory instrument (10).

As shown in FIG. 4B, if the control device (16) determines in step f) (78) to continue (81) the execution of the temperature profile (28) on the sample holder (12), the control of the thermoelectric element in step a) (68) of the method may further comprise additional sub-steps (82, 84, 86, 88). In sub-step g) (82) the control device (16) calculates an average of the at least two measured actual temperatures which are within the predefined maximum permissible temperature deviation range from the at least one set-point temperature and result in at least one calculated temperature difference which is within the predefined maximum permissible temperature difference range. Then, the control device (16) compares the calculated average of the at least two measured actual temperatures with the at least one set-point temperature (34, 40, 46, 52, 58) of the temperature profile (28) in sub-step h) (84). In sub-step i) (86) the control device (16) determines a deviation between the calculated average of the at least two measured actual temperatures and the at least one set-point temperature (34, 40, 46, 52, 58) of the temperature profile (28). Subsequently, the control device (16) adjusts heating or cooling of the thermoelectric element (14) according to the determined deviation between the calculated average of the at least two measured actual temperatures and the at least one set-point temperature (34, 40, 46, 52, 58) of the temperature profile (28) in sub-step j) (88).

The disclosure further relates to a computer program product comprising instructions to cause the laboratory instrument as described herein to execute the steps of the method to monitor and control the temperature of the sample holder of the laboratory instrument during execution of a temperature profile on the sample holder as described herein.

The present disclosure also relates to a computer-readable medium having stored thereon the computer program product comprising instructions to cause the laboratory instrument as described herein to execute the steps of the method to monitor and control the temperature of the sample holder of the laboratory instrument during execution of a temperature profile on the sample holder as described herein.

EXAMPLES

In the following five non-limiting examples, the sample holder comprises four identical temperature sensors. The at least one set-point temperature of the temperature profile is 95° C. The predefined maximum permissible temperature deviation range (called deviation range in the following tables) for identifying and/or excluding a defective temperature sensor is 95° C.+/−5° C. The predefined maximum permissible temperature difference range (called difference range in the following tables) for identifying and/or excluding a temperature sensor with offset is 1° C.

Example 1: All Temperature Sensors are Functioning

| Sensor | Measured actual temperatures | Status |
| --- | --- | --- |
| sensor 1 | 94.9° C. | temp. within deviation range |
| sensor 2 | 94.8° C. | temp. within deviation range |
| sensor 3 | 95.0° C. | temp. within deviation range |
| sensor 4 | 95.1° C. | temp. within deviation range |

| Sensors | Calculated temperature differences | Status |
| --- | --- | --- |
| sensor 1-sensor 2 | 0.1° C. | temp. difference within difference range |
| sensor 1-sensor 3 | 0.1° C. | temp. difference within difference range |
| sensor 1-sensor 4 | 0.2° C. | temp. difference within difference range |
| sensor 2-sensor 3 | 0.2° C. | temp. difference within difference range |
| sensor 2-sensor 4 | 0.3° C. | temp. difference within difference range |
| sensor 3-sensor 4 | 0.1° C. | temp. difference within difference range |

All measured actual temperatures are within the predefined maximum permissible temperature deviation range and all calculated temperature differences are within the predefined maximum permissible temperature difference range. In step f) of the method, the control device determines to continue the execution of the temperature profile on the sample holder.

Example 2: 1 Temperature Sensor is Defective

| Sensor | Measured actual temperatures | Status |
| --- | --- | --- |
| sensor 1 | 94.9° C. | temp. within deviation range |
| sensor 2 (defect) | 0.0° C. | temp. outside deviation range |
| sensor 3 | 95.0° C. | temp. within deviation range |
| sensor 4 | 95.1° C. | temp. within deviation range |

| Sensors | Calculated temperature differences | Status |
| --- | --- | --- |
| sensor 1-sensor 2 | 94.9° C. | temp. difference outside difference range |
| sensor 1-sensor 3 | 0.1° C. | temp. difference within difference range |
| sensor 1-sensor 4 | 0.2° C. | temp. difference within difference range |
| sensor 2-sensor 3 | 95.0° C. | temp. difference outside difference range |
| sensor 2-sensor 4 | 95.1° C. | temp. difference outside difference range |
| sensor 3-sensor 4 | 0.1° C. | temp. difference within difference range |

Three measured actual temperatures are within the predefined maximum permissible temperature deviation range and three calculated temperature differences are within the predefined maximum permissible temperature difference range. In step f) of the method, the control device determines to continue the execution of the temperature profile on the sample holder. Furthermore, sensor 2 is excluded from the repetition of steps a) to f) of the method as the measured actual temperature of sensor 2 is outside of the predefined maximum permissible temperature deviation range and with the measured actual temperature of sensor 2 three temperature differences have been calculated which are outside of the predefined maximum permissible temperature difference range.

Example 3: 1 Temperature Sensor with Offset

| Sensor | Measured actual temperatures | Status |
|---|---|---|
| sensor 1 | 94.9° C. | temp. within deviation range |
| sensor 2 (with offset) | 99.9° C. | temp. within deviation range |
| sensor 3 | 95.0° C. | temp. within deviation range |
| sensor 4 | 95.1° C. | temp. within deviation range |

| Sensors | Calculated temperature differences | Status |
|---|---|---|
| sensor 1-sensor 2 | 5.0° C. | temp. difference outside difference range |
| sensor 1-sensor 3 | 0.1° C. | temp. difference within difference range |
| sensor 1-sensor 4 | 0.2° C. | temp. difference within difference range |
| sensor 2-sensor 3 | 4.9° C. | temp. difference outside difference range |
| sensor 2-sensor 4 | 4.8° C. | temp. difference outside difference range |
| sensor 3-sensor 4 | 0.1° C. | temp. difference within difference range |

All measured actual temperatures are within the predefined maximum permissible temperature deviation range and three calculated temperature differences are within the predefined maximum permissible temperature difference range. In step f) of the method, the control device determines to continue the execution of the temperature profile on the sample holder. Furthermore, sensor 2 is excluded from the repetition of steps a) to f) of the method as with the measured actual temperature of sensor 2 three temperature differences have been calculated which are outside of the predefined maximum permissible temperature difference range.

Example 4: 1 Temperature Sensor with Offset and 1 Temperature Sensor is Defective

| Sensor | Measured actual temperatures | Status |
|---|---|---|
| sensor 1 | 94.9° C. | temp. within deviation range |
| sensor 2 (with offset) | 99.9° C. | temp. within deviation range |
| sensor 3 (defect) | 0.0° C. | temp. outside deviation range |
| sensor 4 | 95.1° C. | temp. within deviation range |

| Sensors | Calculated temperature differences | Status |
|---|---|---|
| sensor 1-sensor 2 | 5.0° C. | temp. difference outside difference range |
| sensor 1-sensor 3 | 94.9° C. | temp. difference outside difference range |
| sensor 1-sensor 4 | 0.2° C. | temp. difference within difference range |
| sensor 2-sensor 3 | 99.9° C. | temp. difference outside difference range |
| sensor 2-sensor 4 | 4.8° C. | temp. difference outside difference range |
| sensor 3-sensor 4 | 95.1° C. | temp. difference outside difference range |

Three measured actual temperatures are within the predefined maximum permissible temperature deviation range and one calculated temperature difference is within the predefined maximum permissible temperature difference range. In step f) of the method, the control device determines to continue the execution of the temperature profile on the sample holder. Sensor 2 is excluded from the repetition of steps a) to f) of the method as with the measured actual temperature of sensor 2 three temperature differences have been calculated which are outside of the predefined maximum permissible temperature difference range. Also Sensor 3 is excluded from the repetition of steps a) to f) of the method as the measured actual temperature of sensor 3 is outside of the predefined maximum permissible temperature deviation range and with the measured actual temperature of sensor 3 three temperature differences have been calculated which are outside of the predefined maximum permissible temperature difference range.

Example 5: 2 Temperature Sensors with Offset and 1 Temperature Sensor is Defective

| Sensor | Measured actual temperatures | Status |
|---|---|---|
| sensor 1 | 94.9° C. | temp. within deviation range |
| sensor 2 (with offset) | 99.9° C. | temp. outside deviation range |
| sensor 3 (defect) | 0.0° C. | temp. outside deviation range |
| sensor 4 (with offset) | 55.1° C. | temp. outside deviation range |

| Sensors | Calculated temperature difference | Status |
|---|---|---|
| sensor 1-sensor 2 | 5.0° C. | temp. difference outside difference range |
| sensor 1-sensor 3 | 94.9° C. | temp. difference outside difference range |
| sensor 1-sensor 4 | 39.8° C. | temp. difference outside difference range |
| sensor 2-sensor 3 | 99.9° C. | temp. difference outside difference range |
| sensor 2-sensor 4 | 44.8° C. | temp. difference outside difference range |
| sensor 3-sensor 4 | 95.1° C. | temp. difference outside difference range |

Less than two of the measured actual temperatures are within the predefined maximum permissible temperature deviation range and none of the calculated temperature difference is within the predefined maximum permissible temperature difference range. In step f) of the method, the control device determines to abort the execution of the temperature profile on the sample holder.

Although the disclosure herein has been described with reference to particular embodiments, it is to be understood that these embodiments are merely illustrative of the principles and applications of the present disclosure. It is therefore understood that numerous modifications may be made to the illustrative embodiments and that other arrangements may be devised without departing from the spirit or scope of the present disclosure as defined by the appended claims. Various publications are cited herein, the disclosures of which are incorporated herein by reference in their entireties.

LIST OF REFERENCE NUMBERS 10 laboratory instrument
12 sample holder
13 recess
14 thermoelectric element
15 sample vessel
16 control device
17 processor
18 computer-readable medium
20 user interface
22 temperature sensor
24 vapor chamber
26 thermal block
27 heat sink
28 temperature profile
30 time axis of the temperature profile
32 temperature axis of the temperature profile
33 room temperature
34 set-point temperature
36 time duration
38 time point
40 first set-point temperature
42 first time duration
44 first time point
46 second set-point temperature
48 second time duration
50 second time point
52 third set-point temperature
54 third time duration
56 third time point
58 fourth set-point temperature
60 forth time duration
62 forth time point
64 cycle of the temperature profile
66 method
68 step a) of the method
68 step b) of the method
70 step c) of the method
72 step d) of the method
76 step e) of the method
78 step f) of the method
80 abort execution of temperature profile
81 continue execution of temperature profile
82 sub-step g) of step a) of the method
84 sub-step h) of step a) of the method
86 sub-step i) of step a) of the method
88 sub-step j) of step a) of the method

The invention claimed is:

1. A method to monitor and control the temperature of a sample holder of a laboratory instrument during execution of a temperature profile on the sample holder, wherein the laboratory instrument comprises a sample holder with high temperature uniformity, a thermoelectric element which is in thermal contact with the sample holder, and a control device, wherein the sample holder comprises at least three identical temperature sensors, wherein the temperature profile comprises at least one set-point temperature, wherein the execution of the temperature profile on the sample holder comprises heating or cooling of the sample holder to the at least one set-point temperature for a predefined time duration and at a predefined time point, the method comprising the following steps:
a) controlling, via the control device, the thermoelectric element to heat or cool the sample holder to the at least one set-point temperature of the temperature profile;
b) measuring, via the at least three identical temperature sensors, at least three actual temperatures of the sample holder and transmit the at least three measured actual temperatures to the control device;
c) comparing, via the control device, the at least three measured actual temperatures with a predefined maximum permissible temperature deviation range from the at least one set-point temperature;
d) calculating, via the control device, at least three temperature differences between each of the at least three measured actual temperatures;
e) comparing, via the control device, each of the at least three calculated temperature differences with a predefined maximum permissible temperature difference range;
f) determining, via the control device, a further execution step selected from: (i) continuing to execute the temperature profile on the sample holder if at least two of the measured actual temperatures are within the predefined maximum permissible temperature deviation range from the at least one set-point temperature and if at least one of the at least three calculated temperature differences is within the predefined maximum permissible temperature difference range; or (ii) aborting execution of the temperature profile on the sample holder if less than two of the measured actual temperatures are within the predefined maximum permissible temperature deviation range from the at least one set-point temperature and if none of the at least three calculated temperature differences is within the predefined maximum permissible temperature difference range.

2. The method according to claim 1, wherein steps a) to f) are repeated when the control device determines to continue execution of the temperature profile on the sample holder or starts execution of a subsequent temperature profile on the sample holder.

3. The method according to claim 2, wherein one of the at least three identical temperature sensors is excluded from the repetition of steps a) to f) when the measured temperature of said temperature sensor is outside of the predefined maximum permissible temperature range or results in at least two calculated temperature differences which are not within the predefined maximum permissible temperature difference range.

4. The method according to claim 3, wherein the control device further comprises a user interface, wherein if the number of remaining temperature sensors decreases to two temperature sensors, the method further comprises displaying a user notification via the user interface regarding a decrease in the number of remaining temperature sensors.

5. The method according to claim 4, wherein the user interface is a display, wherein the user notification is displayed on the display and comprises a prompt for preventive maintenance, a warning indicating that exclusion of a further temperature sensor will result in an immediate abort of execution of the temperature profile on the sample holder, or a user interface control element which can be selected by a user in order to continue the execution of the temperature profile on the sample holder or to start a subsequent temperature profile on the sample holder, or a combination thereof.

6. The method according to claim 1, wherein the temperature profile is executed on the sample holder for performing a temperature-dependent reaction of a test sample, wherein the sample holder comprises at least one recess which is configured to receive a sample vessel comprising a test sample, wherein prior to step a) of the method the at least one sample vessel comprising the test sample is inserted into the at least one recess.

7. The method according to claim 6, wherein the temperature-dependent reaction of the test sample comprises heating or cooling of the test sample to at least one predefined test sample temperature for a predefined time duration, wherein the at least one predefined test sample temperature and the at least one set-point temperature of the temperature profile is the same or different.

8. The method according to claim 6, wherein the temperature-dependent reaction of the test sample is a nucleic acid amplification reaction.

9. The method according to claim 1, wherein the temperature profile is executed on the sample holder for performing a functional test of the thermoelectric element and sample holder, wherein the method is executed during the startup of the laboratory instrument, wherein the temperature profile comprises only one set-point temperature.

10. The method according to claim 1, wherein the control of the thermoelectric element in step a) comprises the following sub-steps if the control device determines to continue the execution of the temperature profile on the sample holder in step f):
   g) calculating, via the control device, an average of the at least two measured actual temperatures which are within the predefined maximum permissible temperature deviation range from the at least one set-point temperature and result in at least one calculated temperature difference which is within the predefined maximum permissible temperature difference range;
   h) comparing, via the control device, the calculated average of the at least two measured actual temperatures with the at least one set-point temperature of the temperature profile;
   i) determining, via the control device, a deviation between the calculated average of the at least two measured actual temperatures and the at least one set-point temperature of the temperature profile; and
   j) adjusting, via the control device, heating or cooling of the thermoelectric element according to the determined deviation between the calculated average of the at least two measured actual temperatures and the at least one set-point temperature of the temperature profile.

* * * * *